Figure 1:
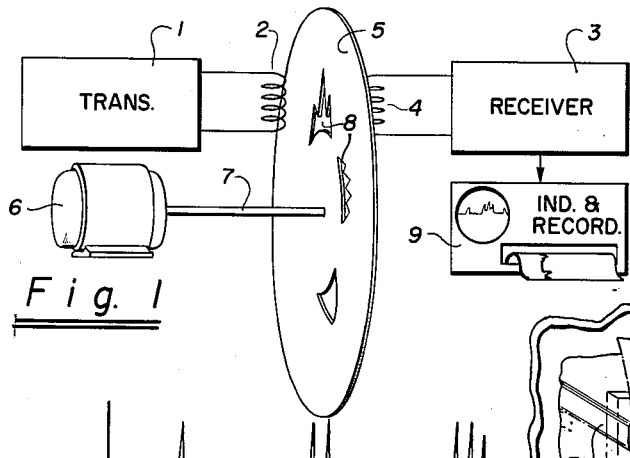

April 17, 1962     W. E. SAVAGE     3,030,572
SIGNAL GENERATOR
Filed May 15, 1957

INVENTOR.
William E. Savage
BY
*Paul B. Hunter*
Attorney

United States Patent Office 3,030,572
Patented Apr. 17, 1962

3,030,572
SIGNAL GENERATOR
William E. Savage, Castro Valley, Calif., assignor to Varian Associates, Palo Alto, Calif., a corporation of California
Filed May 15, 1957, Ser. No. 659,389
7 Claims. (Cl. 324—.5)

The present invention relates in general to signal generators and more specifically to a novel method and apparatus for generating and utilizing simulated gyromagnetic resonance signals. The present invention is useful for providing an artificial gyromagnetic resonance signal which may be utilized for standardizing, testing and calibrating gyromagnetic resonance apparatus.

In certain applications for gyromagnetic resonance apparatus such as, for example, in the control of processes and the like, it is desirable to have associated with the apparatus a standard signal which may be utilized for calibrating, testing and standardizing the equipment. By periodically feeding the standard signal into the apparatus in place of the gyromagnetic resonance signal derived from the sample under analysis and comparing the output signals obtained, valuable information may be obtained concerning the operation of the system. Moreover, the standard signal obtained at one time compared with a standard signal obtained at some time later may give valuable information concerning possible malfunctions of the apparatus. In addition, the standard signal may be utilized for calibrating the equipment.

The present invention provides a novel gyromagnetic signal generator which may be alternately switched into the receiver portion of a gyromagnetic resonance spectrometer, as desired, to provide a standard signal for comparison with the signal obtained from the sample under analysis for standardization, calibration or testing purposes.

The principal objects of the present invention is to provide a novel gyromagnetic signal generator which may be utilized for calibrating, testing and standardizing gyromagnetic resonance apparatus.

One feature of the present invention is the provision of a transmitter means coupled to a receiver means through the intermediary of a variable coupling means, said coupling means adapted to vary the coupling between the transmitter and receiver means in variable accordance with a standard preset function.

Another feature of the present invention is the provision of a transmitter means and a receiver means coupled together through the intermediary of an apertured electromagnetic shield, the apertures having a definite prescribed configuration corresponding to the standard signal to be generated and the apparatus adapted to produce relative motion between the electromagnetic shield and transmitter or receiver means, whereby the signals received in the receiver means are made to conform to an exact standard.

Another feature of the present invention is the provision of a novel gyromagnetic resonance signal generator adapted for use with gyromagnetic process control monitor comprising a transmitter and receiver means coupled together through the intermediary of an apertured electromagnetic shield serving to vary the coupling between the transmitter and receiver coils in variable accordance with the prescribed signal and means for periodically monitoring the standard signal and comparing it with previously obtained standard signals to thereby determine whether changes have occurred in the sample under analysis or in the gyromagnetic resonance apparatus.

Another feature of the present invention is the provision of transmitter and receiver coils in the novel gyromagnetic signal generator said coils having a narrow cross-sectional area and being disposed on opposite sides of an apertured electrical conducting rotatable disc, the apertures in the disc having configurations corresponding to desired signals to be generated whereby simulated high resolution spectra signals may be generated.

Another feature of the present invention is the provision of a novel stationary apertured electromagnetic shield positioned between the transmitter and receiver coils for obtaining enchanced signal resolution.

Other features and advantages of the present invention will be more apparent after a perusal of the following specification taken in connection with the accompanying drawings wherein.

Figure 4:
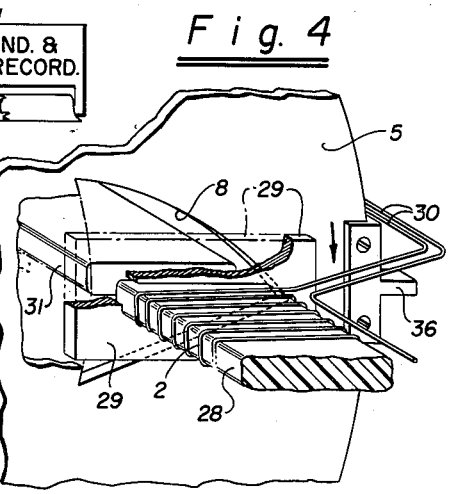
Figure 2:
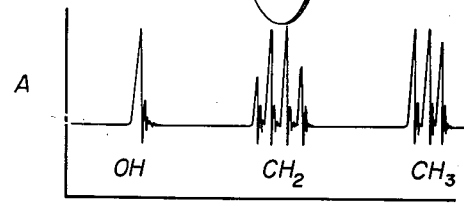
Figure 3:
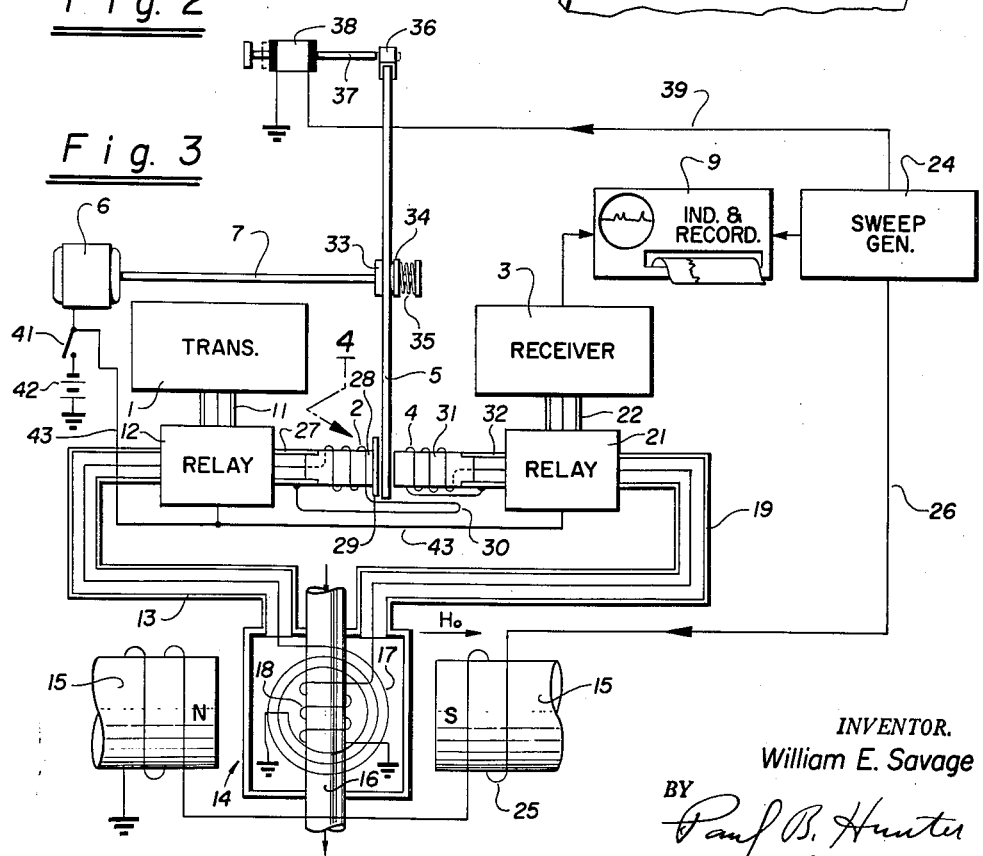

FIG. 1 is a schematic block diagram of the novel gyromagnetic signal generator of the present invention, FIG. 2 is a spectrum in the time domain indicating the simulated gyromagnetic resonance signal obtained from the apparatus of FIG. 1, FIG. 3 is a schematic block diagram of a novel embodiment of the present invention, and FIG. 4 is a fragmentary enlarged perspective view of a portion of the structure of FIG. 3 delineated by view line 4 of FIG. 3.

Referring now to FIG. 1 there is shown in schematic form one embodiment of the novel gyromagnetic signal generator of the present invention. In particular, a fixed frequency transmitter 1 utilizing a transmitter coil 2 is electromagnetically coupled to a receiver 3, tuned to the transmitter 1, through a receiver coil 4 via the intermediary of an apertured conductive disc 5. The disc 5 is made of a good electrical conducting material as of, for example, aluminum or copper and forms an electromagnetic shield between the transmitter 1 and receiver 3. A motor 6 drives the disc 5 via shaft 7 at a desired angular velocity. Apertures 8 are provided in the disc 5 at a certain convenient radius. The configurations of the apertures 8 are designed to produce a prescribed variable coupling between the transmitter 1 and receiver 3 with angular rotation of the disc. As an aperture 8 moves into position between transmitter coil 2 and receiver coil 4 a signal will be transmitted through the apertured disc 5 and received in receiver coil 4. The received signal is then propagated to receiver 3 wherein it is amplified and detected to produce a D.C. signal in variable accordance with the preset configuration of apertures 8. This variable D.C. signal, simulating a gyromagnetic resonance signal, is then fed to an indicator and recorder 9 wherein it is displayed and/or indicated, as desired.

The transmitter coil 2 and receiver coil 4 are provided with a relatively narrow cross-sectional area and positioned on opposite sides of the disc 5 (see FIG. 4) to provide a high resolution signal. The circumferential length of each aperture 8 determines approximately the line width of the simulated gyromagnetic resonance signal whereas the radial dimension of the aperture 8 determines approximately the amplitude of the simulated gyromagnetic resonance signal. The level of coupling between transmitter coil 2 and receiver coil 4 may be adjusted by changing the spacing between the coils or by varying the gain or power of the transmitter, as desired. Additional apertures 8 may be provided circumferentially in the disc 5, the circumferential separation therebetween determining the relative frequency separation of the simulated gyromagnetic resonance lines produced by the respective apertures 8.

Referring now to FIG. 2 there is shown a simulated gyromagnetic resonance spectrum indicative of the amplitude of the D.C. signal in the output of receiver 3 as a function of time. The D.C. signal is in variable accordance with the configuration of the apertures 8 in the disc 5, in this instance, simulating the hydrogen nuclear resonance in ethyl alcohol ($CH_3$—$CH_2$—$OH$).

Referring now to FIG. 3 there is shown a schematic block diagram forming another embodiment of the present invention. More specifically, this embodiment provides a novel gyromagnetic resonance signal generator useful in cojunction with a gyromagnetic resonance process control monitor for calibrating, testing and standardizing the control monitor.

A transmitter 1, which is the same transmitter utilized for the gyromagnetic resonance spectrometer portion of the process control monitor, transmits an R.F. signal via coaxial line 11 to coaxial relay 12. Coaxial relay 12, in one position, allows the R.F. energy from transmitter 1 to pass therethrough via coaxial line 13 to a gyromagnetic resonance probe 14. The probe 14 is immersed in a polarizing magnetic field $H_o$ produced by magnet 15 and has a channel 16 therewithin for passing the sample of matter under analysis through the probe. The center conductor of the coaxial transmission line 13, within the probe, is wound into a coil 17 and positioned substantially with its axis at right angles to the polarizing magnetic field $H_o$ produced by the magnet 15.

A detector or pickup coil 18 is wound around the channel 16 with its axis substantially at right angles to the polarizing magnetic field $H_o$ and to the axis of the transmitter coil 17. The detector or pickup coil 18 is connected to the center conductor of a coaxial line 19 leading to coaxial relay 21. Coaxial relay 21, in one position, allows the energy propagated thereto by coaxial line 19 to be fed to a receiver 3, which is the receiver utilized in the gyromagnetic resonance spectrometer portion of the process control monitor. The output of receiver 3 is fed to an indicator and recorder 9 which indicates and/or records the signal derived from receiver 3, as desired.

A sweep generator 24 serves to provide a very low frequency saw-tooth current signal to sweep coils 25 of the magnet 15 for modulating the intensity of the polarizing magnetic field $H_o$ in a saw-tooth manner. A reference saw-tooth signal is derived from the sweep generator 24 and fed to the indicator and recorder 9 to produce synchronism of the horizontal sweep of the oscilloscope of the indicator with the sweep of the magnetic field applied to the gyromagnetic ensemble under analysis. In this manner successive resonances are obtained of the separate gyromagnetic ensembles, if any, contained within the sample of matter under analysis. The successive resonances are detected in the receiver 3 and recorded and/or displayed to yield a spectrum of the sample of matter under analysis, as shown in FIG. 2.

Thus far described the apparatus of FIG. 3 comprises the spectrometer portion of the gyromagnetic resonance process control monitor and is substantially identical to the standard gyromagnetic resonance spectrometer as set forth in U.S. Patent Re. 23,950, entitled "Method and Means for Chemical Analysis by Nuclear Inductions" issued February 22, 1955 to Bloch and Hansen.

However, in addition, coaxial relay 12 is a two position relay and in its other position, allows the R.F. energy of the transmitter 1 supplied thereto to be passed therethrough via coaxial line 27 to transmitter coil 2. The transmitter coil 2 is wound on a dielectric block 28 as of, for example, polystyrene or Lucite, having a long narrow rectangular cross-section (see FIG. 4). A thin rectangular plate 29 is mounted on the end of the dielectric block 28 adjacent the disc 5 and in a plane normal to the longitudinal axis of the block 28. The plate 29 is provided with a long narrow slot of substantially the same dimensions as the cross-sectional area of the block 28 and is secured thereon as by cement or a suitable bracket, not shown. The plate 29 serves to confine the R.F. coupling between the transmitter coil 2 and receiver coil 4 to a narrow slit-like region for improving the resolution of signals coupled between the transmitter 1 and receiver 3. The plate 29 is made of a good conducting material, as of, for example, copper or brass.

A single loop 30 is provided in series with the coil 2 and extends around the extremity of the apertured conductive disc 5 for continuously coupling a small amount of R.F. energy from the transmitter coil 2 to the receiver coil 4. This small continuous R.F. coupling simulates the leakage R.F. coupling between the transmitter coil 17 and detector or pickup coil 18 contained within the probe 14. This leakage R.F. coupling is desired when using a homodyne receiver and detector; however, when other types of resonance detection are utilized in the receiver such as, for example, a phase sensitive detector, the leakage signal is not required and accordingly coil 30 may be deleted. In addition, the small continuous coupling between transmitter 1 and receiver 3 may be obtained by other coupling means disposed elsewhere in the apparatus, as desired.

The receiver coil 4 is wound on a dielectric block 31 as of, for example, Lucite or polystyrene having a long narrow rectangular cross-section and is coupled to coaxial relay 21 via coaxial line 32. Coaxial relay 21 is a two position relay and in its other position allows energy to be propagated from receiver coil 4 via coaxial line 32 therethrough to coaxial line 22 thence to receiver 3.

The apertured conductive disc 5 is rotatably driven by motor 6 via shaft 7 and spring loaded clutch plates 33 and 34. A projection 36 extends outwardly in a radial direction from the circumference of the disc 5 for engagement with a retractable stop 37. A solenoid 38 carries the stop therewithin and when actuated, at the beginning of each saw-tooth sweep, by an impulse derived from the sweep generator 24 via lead 39 the solenoid 38 retracts the stop 37 and allows the disc 5 to rotate at an angular velocity determined by the speed of the motor 6. When stop 37 is extended, projection 36 will come to rest against the stop 37 and constrain the disc 5 from further angular rotation about shaft 7 until stop 37 is retracted via actuation of solenoid 38. When stop 37 is retracted disc 5 ceases to slip with respect to clutch plates 33 and 34 and the conductive disc 5 enters into angular rotation at an angular velocity determined by motor 6.

A switch 41 which may be manually or electrically actuated, as desired, when closed to source 42 serves to energize motor 6, relay 12 and relay 21 via leads 43. When the relays 12 and 21 are energized the transmitter 1 is connected via relay 12 to transmitter coil 2 and receiver 3 is connected via relay 21 to receiver coil 4. When switch 41 is opened motor 6 is deenergized and relay 12 and relay 21 return to their normal position to thereby connect transmitter 1 to transmitter coil 17 and receiver 3 to detector or pickup coil 18 for monitoring the sample of matter under analysis. Simultaneously therewith transmitter coil 2 and receiver coil 4 are disconnected from transmitter 1 and receiver 3 respectively.

In operation, switch 41 is periodically closed to thereby actuate motor 6 and relays 12 and 21 to apply the standard simulated gyromagnetic resonance signal to the gyromagnetic resonance process control monitor. The standard signal is recorded or indicated, as desired, on the indicator and recorder 9. By observing the standard signal the gyromagnetic resonance apparatus may be calibrated or tested, as desired. In addition, by comparing the standard signal as recorded on indicator 9 with previously recorded standard signals, malfunctions of the gyromagnetic resonance apparatus may be detected. Moreover, the gyromagnetic signal generator is useful in providing a signal, when the signal from the gyromagnetic ensemble under analysis is lost, for determining whether or not a malfunction lies in the receiver portion of the gyromagnetic apparatus or in the magnet or sample portion thereof.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance equipment, a transmitter means for supplying an R.F. signal, a receiver means for receiving the R.F. signal to produce a D.C. signal in variable accordance with the amplitude of the received R.F. signal, and means employing phenomenon substantially entirely other than gyromagnetic resonance for time varying the R.F. magnetic coupling between said transmitter means and said receiver means in accordance with a standard simulated gyromagnetic resonance signal line shape to produce a standard D.C. simulated gyromagnetic resonance signal.

2. The apparatus according to claim 1 wherein the means for varying the magnetic coupling between said transmitter means and said receiver means comprises an aperture conductive member which is moved relative to one of said transmitter or receiver means, the inner margin of said aperture in said member having a prescribed configuration to produce a signal in said receiver means in variable accordance with the configuration of said aperture whereby an extremely exact standard simulated gyromagnetic resonance signal is obtained in said receiver means.

3. The apparatus according to claim 2 wherein said transmitter means includes a transmitter coil means having a narrow elongated cross-sectional area, and said receiver includes a receiver coil means having a narrow elongated cross-sectional area, whereby the resolution of the simulated gyromagnetic resonance signal obtained in the receiver means is enhanced.

4. The apparatus according to claim 3 including a second conductive member positioned between said transmitter coil means and said receiver coil means and having a narrow slit therein for further enhancing the resolution of the simulated gyromagnetic resonance signal produced in said receiver means.

5. In combination, a transmitter means for providing an R.F. electromagnetic signal, means for applying the radio frequency signal to an ensemble of gyromagnetic bodies immersed in a polarizing magnetic field for producing gyromagnetic resonance of the gyromagnetic bodies, means for picking up the gyromagnetic resonance signals of the gyromagnetic bodies, receiver means for amplifying and detecting the picked up gyromagnetic resonance signals, if any, means for periodically decoupling said receiver means from said pickup means and for by-passing a portion of the R.F. signal derived from said transmitter means around the ensemble of gyromagnetic bodies and applying the R.F. signal to said receiver means, and means employing phenomenon other than gyromagnetic resonance for varying the amplitude of the by-passed R.F. signal as applied to said receiver means in variable accordance with a standard predetermined function to thereby produce a standard simulated gyromagnetic resonance signal line shape in said receiver for testing, calibrating and standardizing, as desired.

6. The apparatus according to claim 5 wherein said means for varying the amplitude of the by-passed R.F. signal in accordance with a pre-determined function includes, an apertured conductive member movable relative to one of said transmitter or receiver means, the aperture in said member having a prescribed configuration to produce a signal in said receiver means in variable accordance with the configuration of said aperture whereby an extremely exact standard simulated gyromagnetic resonance signal is obtained in said receiver means.

7. The apparatus according to claim 2 wherein said transmitter means includes a transmitter coil, and said receiver means includes a receiver coil, and said apertured movable conductive member varies the R.F. magnetic coupling between said transmitter and receiver coils.

References Cited in the file of this patent

UNITED STATES PATENTS

| | | |
|---|---|---|
| 1,337,737 | Van der Bijl | Apr. 20, 1920 |
| 2,075,125 | Mabry et al. | Mar. 30, 1937 |
| 2,426,992 | Folland et al. | Sept. 9, 1947 |
| 2,505,557 | Lyman | Apr. 25, 1950 |
| 2,630,529 | Mann et al. | Mar. 3, 1953 |
| 2,703,368 | Wrathall | Mar. 1, 1955 |
| 2,799,823 | Shaw et al. | July 16, 1957 |
| 2,856,579 | Packard | Oct. 14, 1958 |

OTHER REFERENCES

Gutowsky et al.: Journal of Chemical Physics, vol. 19, No. 10, October 1951, pp. 1259–1267.

Elksen et al.: Analytical Chemistry, vol. 27, No. 2, February 1955, pp. 290 through 292.